US 8,180,985 B2
May 15, 2012

(12) United States Patent
Sasage

(10) Patent No.: US 8,180,985 B2
(45) Date of Patent: May 15, 2012

(54) STORAGE SWITCH, STORAGE SYSTEM, AND DATA COPYING METHOD USING BITMAPS REPRESENTING DIFFERENT SIZED REGIONS

(75) Inventor: Koutarou Sasage, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 399 days.

(21) Appl. No.: 12/637,409

(22) Filed: Dec. 14, 2009

(65) Prior Publication Data
US 2010/0161924 A1    Jun. 24, 2010

(30) Foreign Application Priority Data
Dec. 22, 2008  (JP) .................. 2008-325318

(51) Int. Cl.
*G06F 13/00* (2006.01)
(52) U.S. Cl. ........................ 711/162; 707/610
(58) Field of Classification Search .................. 711/161; 707/610
See application file for complete search history.

(56) References Cited

U.S. PATENT DOCUMENTS

| 6,732,245 | B2 | 5/2004 | Kaiya |
| 6,757,797 | B1 | 6/2004 | Kaiya |
| 6,785,791 | B2 | 8/2004 | Watanabe |
| 7,873,782 | B2 * | 1/2011 | Terry et al. .................. 711/114 |
| 2008/0229038 | A1 * | 9/2008 | Kimura et al. ............... 711/162 |

FOREIGN PATENT DOCUMENTS

| JP | 2001-166974 A | 6/2001 |
| JP | 2002-297455 A | 10/2002 |

* cited by examiner

*Primary Examiner* — Jared Rutz
(74) *Attorney, Agent, or Firm* — Fujitsu Patent Center

(57) ABSTRACT

A storage switch includes a first bitmap generator for generating a first bitmap, a controller for controlling copying of data, a first modifier, a second bitmap generator for generating a second bitmap, a second modifier, a merging controller for controlling to generate a third bitmap. When the writing of data is performed during the copying of data, the merging controller modifies a part of the index bits in the third bitmap corresponding to a part of the index bits of the first bitmap modified by the first modifier on account of the copying of data performed before the writing of data, and merges the second bitmap modified by the second modifier and the third bitmap modified by the merging controller. The controller resumes copying of data of any sub-regions on the basis of the merged bitmap.

12 Claims, 18 Drawing Sheets

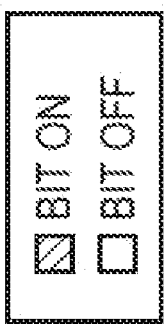
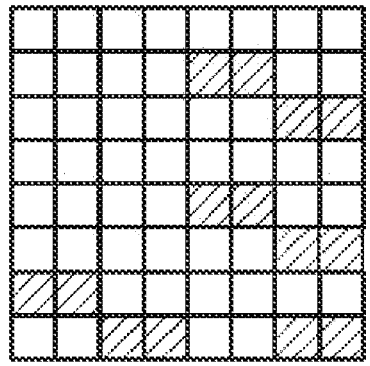
FIG. 3B
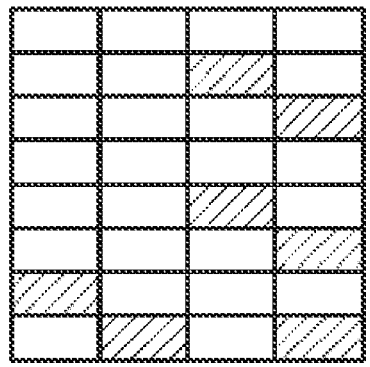
FIG. 3A

BITMAP SIZE EXPANSION

BIT ON
BIT OFF

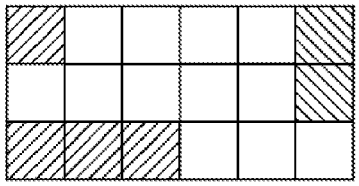
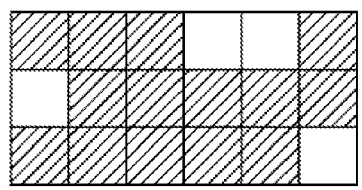
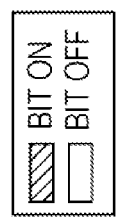
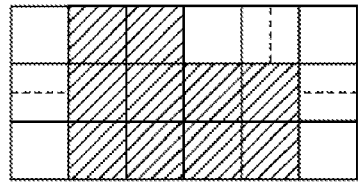
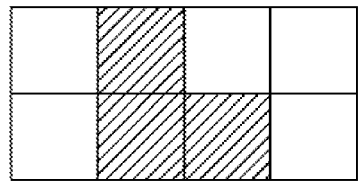

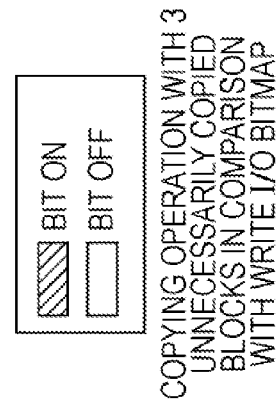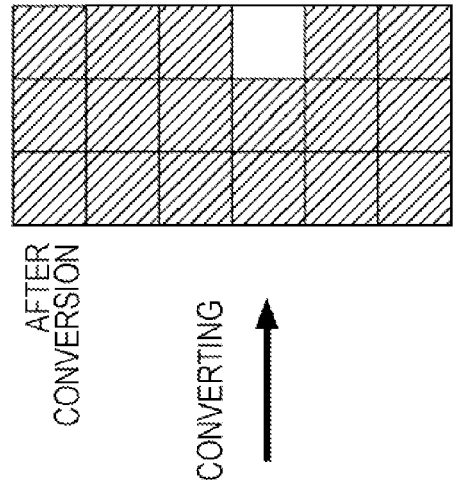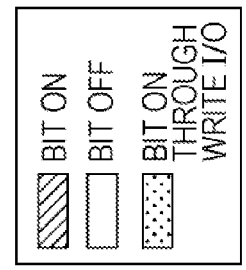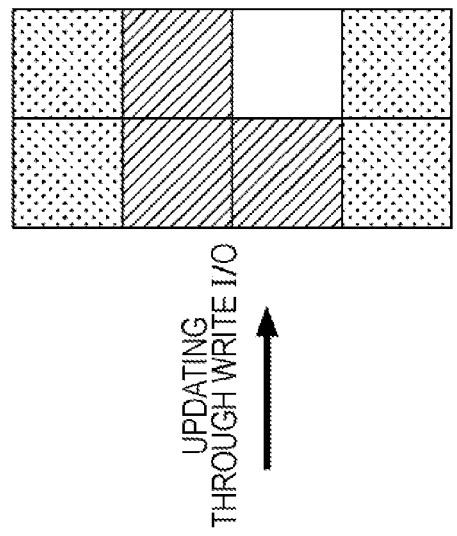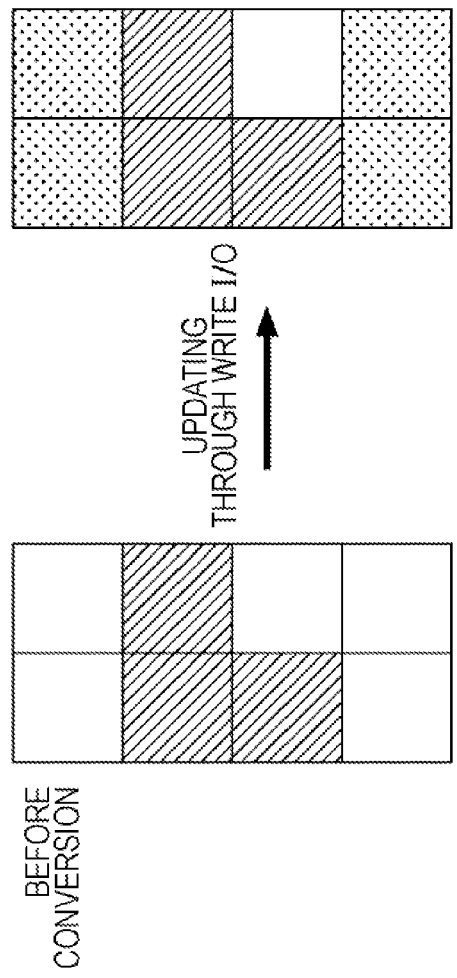

FIG. 9A
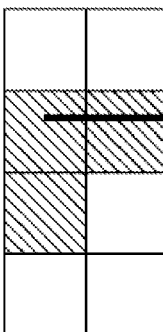
PRE-CONVERSION BITMAP
FIG. 9B
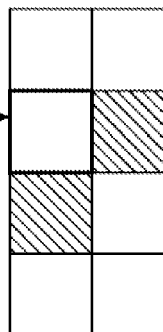
BLOCK HAVING UNDERGONE COPYING SET TO BIT OFF
FIG. 9C
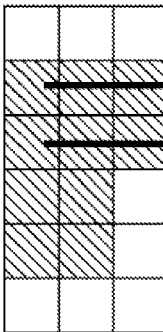
POST-CONVERSION BITMAP
FIG. 9D
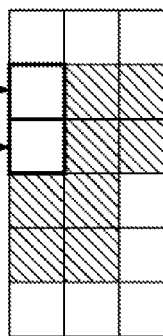
BIT RELATED TO BIT OFF IN PRE-CONVERSION BITMAP SET TO BIT OFF
FIG. 9E
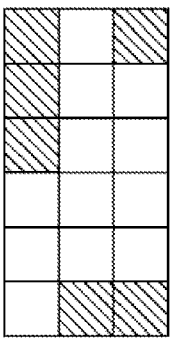
WRITE I/O BITMAP
FIG. 9F
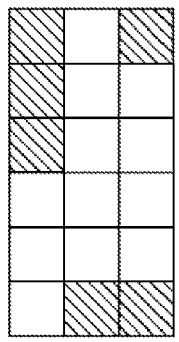
LEFT INTACT
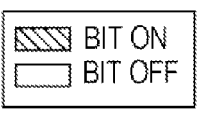
BIT ON
BIT OFF FIG. 12B
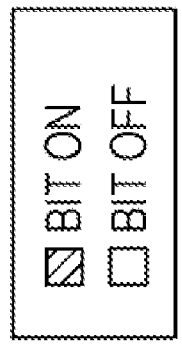
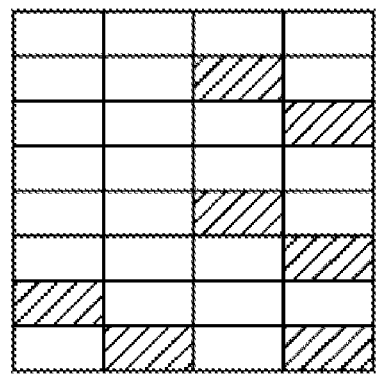
BITMAP SIZE EXPANSION
FIG. 12A
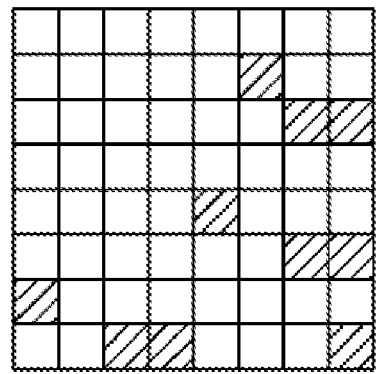

BITMAP SIZE EXPANSION

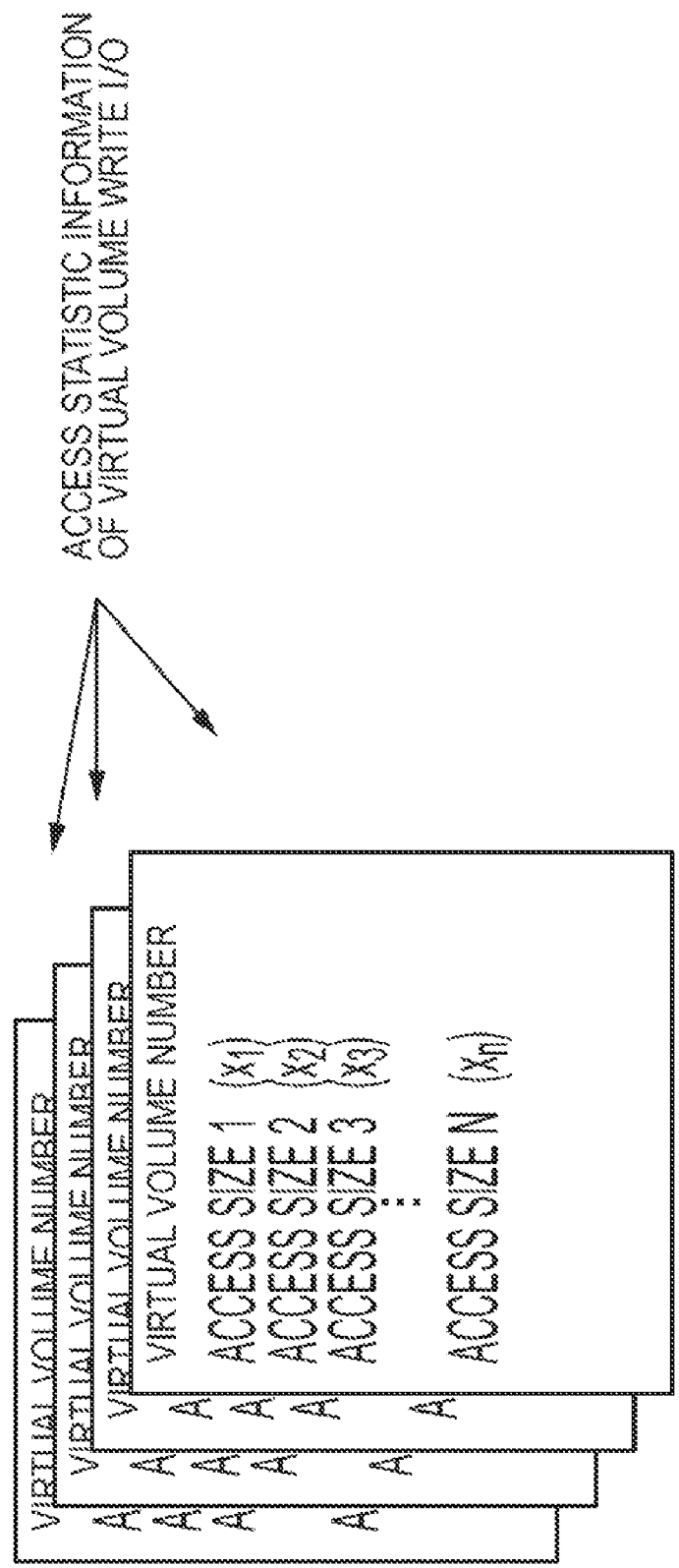

FIG. 17A (MEAN $\mu$)

$$\mu = (x_1 + x_2 + \ldots + x_N)/N$$

FIG. 17B (STANDARD DEVIATION $\delta$)

$$\delta^2 = (1/N) \times \sum_{i=1}^{N} (x_i - \mu)^2$$

$$\delta = \sqrt{\delta^2}$$

STORAGE SWITCH, STORAGE SYSTEM, AND DATA COPYING METHOD USING BITMAPS REPRESENTING DIFFERENT SIZED REGIONS

CROSS-REFERENCE TO RELATED APPLICATION

This application is based upon and claims the benefit of priority of the prior Japanese Patent Application No. 2008-325318, filed on Dec. 22, 2008, the entire contents of which are incorporated herein by reference.

FIELD

The embodiments discussed herein are related to a storage switch, a storage system, and a data copying method.

BACKGROUND

A storage switch (hereinafter referred to as a virtual switch) supplies a server with a virtual volume by extracting and linking physical volumes of a storage connected to the switch via a storage area network (SAN).

FIG. 18 illustrates a structure of a virtual storage system including typical virtual switches 11 and 12. The virtual switches 11 and 12 supply an operation server 14 with virtual volumes by extracting and linking physical volumes 19 of at least one storage 15 (magnetic disk device). Commands to extract the virtual volumes and to link the virtual volumes to the virtual switches 11 and 12 are issued by a management server 13. The operation server 14, the virtual switches 11 and 12, and the storage 15 is interconnected via storage area networks (SANs) 16 and 17. The management server 13 and the virtual switches 11 and 12 are connected via a local area network (LAN) 18.

The virtual switches 11 and 12 may have a copying function for copying a virtual volume in response to an instruction from the management server 13 or periodically. In order to copy the virtual volume, the virtual switches 11 and 12 partition a copy target area of the virtual volume into a plurality blocks by predetermined constant size, and perform a copying operation on a per block basis. The virtual switches 11 and 12 then generate bitmap information in which the blocks resulting from partitioning the copy target area of the virtual volume are respectively mapped to index bits, and manage the blocks in terms of being copied or uncopied depending on whether each index bit is on or off. At the start of copying, all index bits of the bitmap information are set to be on and the index bit of a copied block is then set to off. When all index bits are set to off, the copying operation has been completed.

The copying operation of the virtual volume is performed in a manner free from affecting the operation server 14. In the middle of the copying operation, the operation server 14 is permitted to perform an input/output (I/O) operation. If the operation server 14 has issued a read I/O instruction in the middle of the copying operation, data is read from a virtual volume of a copy source. If the operation server 14 has issued a write I/O instruction in the middle of the copying operation, data is written onto virtual volumes of a copy source and a copy destination.

Even after the copying operation of all the data on the copy area of the virtual volume has been completed, an equivalent state between the copy source and the copy destination is maintained until a copy end instruction is issued (equivalence maintenance state). No data is written onto the copy destination during the copying operation or during a suspension period throughout which the copying operation of the virtual volume in the equivalence maintenance state is suspended. If the operation server 14 issues the write I/O instruction to the virtual volume in the copying operation, data is written onto the virtual volume of the copy source only, and the bitmap information of that block is set to be an uncopied state (ON state). When the copying operation resumes, the block having the bitmap information in the uncopied state starts to be copied.

There are Japanese Laid-open Patent Publication Nos. 2001-166974 and 2002-297455 as reference documents.

The size of the bitmap information is determined by the size of virtual volume and the size of partitioned blocks. For example, if a 2 TB virtual volume is partitioned into blocks, each block having a size of 32 MB, the size of the bitmap information becomes 8 KB. Given the same size of the virtual volume, the larger the block size, the smaller the bitmap information size, and the smaller the block size, the larger the bitmap information size.

With a smaller block size, the copy progress state can be more efficiently controlled. For example, the operation server (host system, exterior system) may now perform a write I/O to the copy source for a 1 MB portion of a predetermined block. The block containing data updated in response to the write I/O instruction is changed to an uncopied state. If the block size is 32 MB, a copying operation is performed with unupdated data of 31 MB needlessly copied. If updated data spreads two blocks, a copying operation is performed with unupdated data of 63 MB needlessly copied. If the block size is 1 MB, and the updated data falls within one block, a copying operation is performed in a manner free from needless copying of any data.

Since exclusive control is performed in the middle of a copying operation of a block, a write I/O instruction to the block from the operation server needs to wait on standby. The smaller the block size, the less the contention with the write I/O instruction occurs. Even if a contention occurs, a waiting time to the write I/O instruction is shorter.

An area available for system information such as the bitmap information on the virtual switch is typically not so large. For this reason, the size of the bitmap information is fixed, and the block size is determined by the size of the virtual volume. The larger the size of the virtual volume, the larger the block size is forced to be.

On the other hand, the memory or the disk storing the system information such as the bitmap information becomes less costly each year. Room may be caused in a system information area by performing hot-swap or hot-add operation on system hardware, or by improving system firmware. However, if an area available for the system information is expanded by an addition of area, the bitmap information cannot be dynamically changed in the middle of the copying operation, and the size of the bitmap information cannot be changed.

SUMMARY

According to an aspect of an embodiment, a storage switch for controlling reading and writing of data from and into a storage area, the storage switch includes a first bitmap generator for generating a first bitmap including a plurality of index bits which render the storage area to be partitioned into a plurality of regions each having a predetermined partition size and being associated with each of the index bits of the first bitmap, a controller for controlling copying of data in a part of the regions to another part of the regions, a first modifier for modifying at least one of the index bits associated with at least one of the regions having undergone a copying, a second bitmap generator for generating a second bitmap including a plurality of index bits which render the storage area to be partitioned into a plurality of sub-regions each having a partition size smaller than the predetermined partition size and being associated with each of the index bits of the second bitmap, the controller controlling writing of data into at least one of the sub-regions addressed by a write request from the exterior, a second modifier for modifying at least one of the index bits corresponding to the at least one sub-regions addressed by the write request from the exterior, and a merging controller for controlling to generate a third bitmap including a plurality of index bits which render the storage area to be partitioned into a plurality of sub-regions each having the same size as the partition size, the merging controller, when the writing of data is performed during the copying of data, modifying a part of the index bits in the third bitmap corresponding to a part of the index bits of the first bitmap modified by the first modifier on account of the copying of data performed before the writing of data, and merging the second bitmap modified by the second modifier and the third bitmap modified by the merging controller, the controller resuming copying of data of any sub-regions on the basis of the merged bitmap.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B illustrate a bitmap expanded by an integer multiple times.

FIGS. 5A-5D illustrate an example of virtual switch operation.

FIGS. 7A-7C illustrate an operation of the virtual switch with no write I/O bitmap prepared.

FIGS. 9A-9F illustrate a pre-conversion bitmap, a post-conversion bitmap, and a write I/O bitmap in comparison.

FIGS. 12A and 12B illustrate a bitmap contracted by an integer fraction.

FIG. 16 illustrates an example of statistic information stored in a partition size calculator.

FIGS. 17A and 17B illustrate calculation equations used by the partition size calculator.

DESCRIPTION OF EMBODIMENTS

Figure 1:
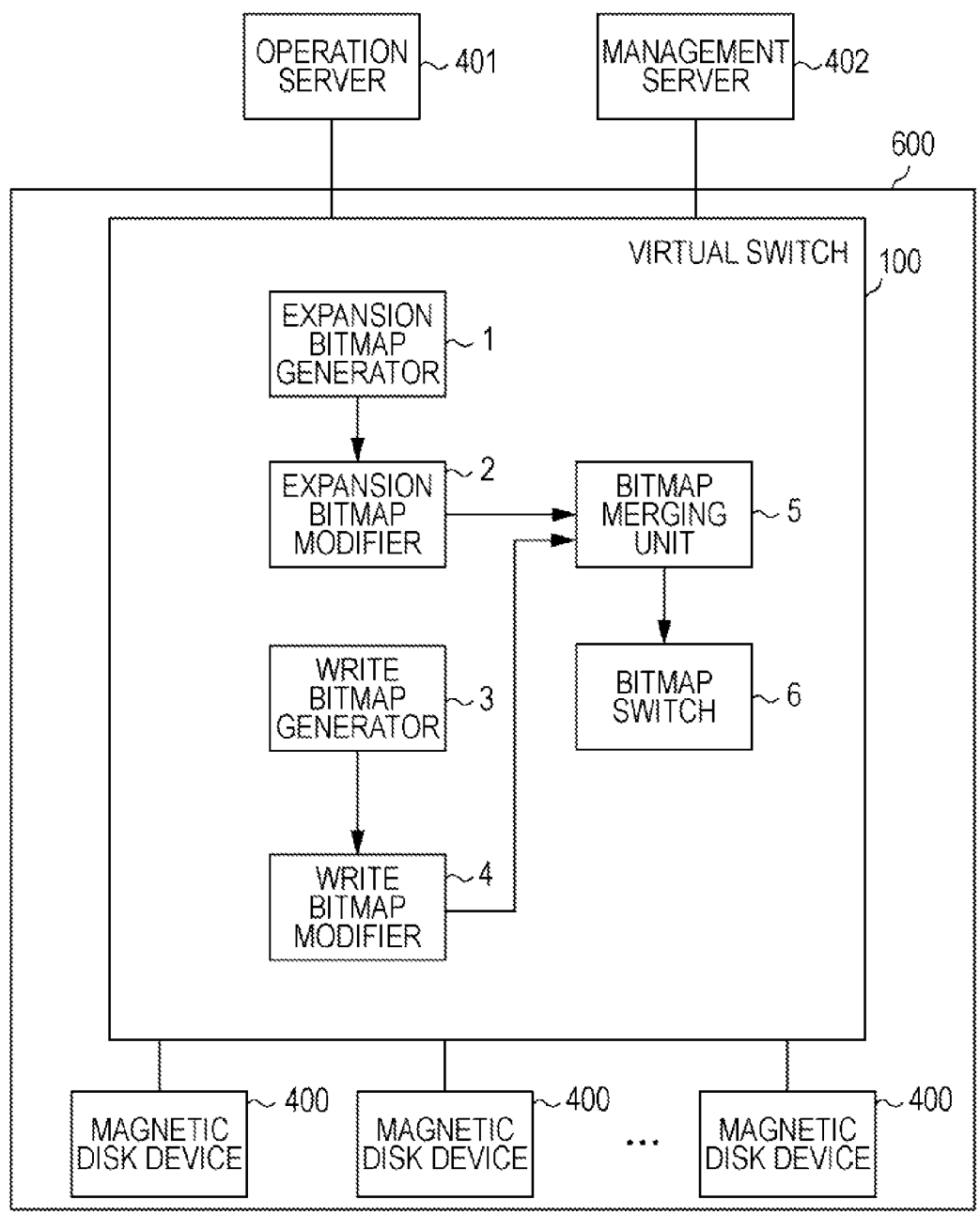
FIG. 1 is a functional block diagram of a storage system.

FIG. 1 illustrates a structure of a storage system 600 of one embodiment. The storage system 600 includes a virtual switch (storage switch) 100, and at least one magnetic disk device 400 (storage device). The storage system 600 is connected to an operation server 401 of an exterior system (host) and a management server 402 of an exterior system. The operation server 401 performs a data write operation and a data read operation on a virtual volume managed by the virtual switch 100 via a SAN. The management server 402 issues a process execution command to the virtual switch 100 via a LAN and acquires process results.

The function and structure of the virtual switch 100 are described below. The virtual switch 100 includes an expansion bitmap generator 1 for a first bitmap generator, an expansion bitmap modifier 2 for a first bitmap modifier, a write bitmap generator 3 for a second bitmap generator, a write bitmap modifier 4 for a second bitmap modifier, a bitmap merging unit 5, and a bitmap switch 6.

A first embodiment is described below. In accordance with the first embodiment, the bitmap is expanded (i.e., a partition size is reduced).

The expansion bitmap generator 1 generates a bitmap (hereinafter referred to as a first bitmap) with a region of a partition size smaller than a current partition size (a predetermined partition size) being mapped to an index bit. The first bitmap includes a plurality of index bits which render the storage area to be partitioned into a plurality of regions each having the predetermined partition size and being associated with each of the index bits of the first bitmap.

The expansion bitmap modifier 2 modifies an index bit corresponding to a copied region of the virtual volume on the first bitmap.

The write bitmap generator 3 generates a bitmap having the same partition size as that of the first bitmap (hereinafter referred to as a second bitmap). It is sufficient if the second bitmap is generated in response to at least a write request from the operation server 401.

If the operation server 401 has issued a write request to a virtual volume in the middle of the copying operation of the virtual volume, the write bitmap modifier 4 modifies on the second bitmap an index bit of a region of the virtual volume to which the write request has occurred.

The bitmap merging unit 5 merges the first bitmap modified by the expansion bitmap modifier 2 and the second bitmap modified by the write bitmap modifier 4.

The bitmap switch 6 switches bitmaps from the bitmap having the current partition size to the bitmap merged by the bitmap merging unit 5.

Figure 2:
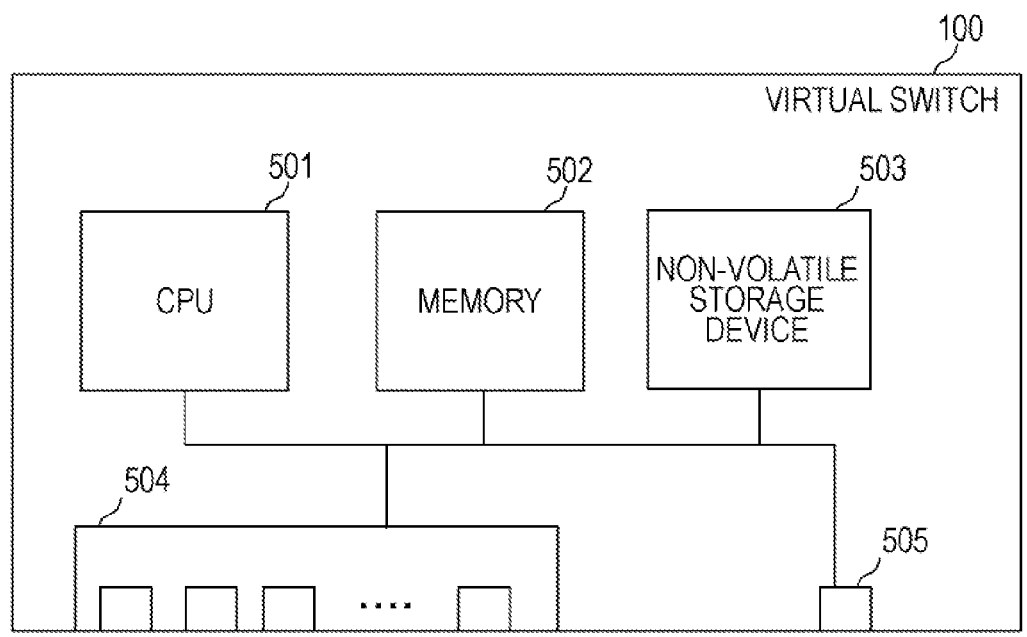
FIG. 2 illustrates a software structure of a virtual switch.

FIG. 2 illustrates a hardware structure of the virtual switch 100. The virtual switch 100 includes a central processing unit (CPU) 501, a memory 502, and a non-volatile storage device 503 such as a flash ROM. The CPU 501 (controller) controls copying of data in a part of the regions to another part of the regions and writing of data in a part of the regions. The virtual switch 100 connects the magnetic disk device 400 to the operation server 401 in a storage area network (SAN) connection. The virtual switch 100 includes a SAN interface 504 controlling inputting of data to and outputting data from the magnetic disk device 400. The virtual switch 100 also includes a local area network (LAN) interface 505 to be connected to the management server 402.

The functions (bitmap generator bitmap modifier, merging controller, bitmap switching controller, and etc.) illustrated in FIG. 1 are implemented by firmware pre-stored on the non-volatile storage device 503 when the firmware cooperates with hardware elements including the CPU 501 and the memory 502.

Referring to FIGS. 3A and 3B, an expanded bitmap is described. Here, a 64 MB virtual volume is converted from a 4-byte bitmap to an 8-byte bitmap. The expansion bitmap generator 1 generates the bitmap having a block size of 1 MB (see FIG. 3B) from the bitmap having a block size of 2 MB (see FIG. 3A). Since the overall amount of the virtual volume size is 64 MB, the bitmap size generated is thus expanded from 4 bytes to 8 bytes. Since the bitmap size is doubled, the number of blocks to be managed is also doubled. The block size is inversely proportional to 2, i.e., halved.

The one index bit prior to the bitmap conversion is represented by two index bits in the post-conversion bitmap. The expansion bitmap modifier 2 sets to on all bits on the post-conversion bitmap corresponding to an on bit in the bitmap prior to the conversion.

Figures 4A, 4B:
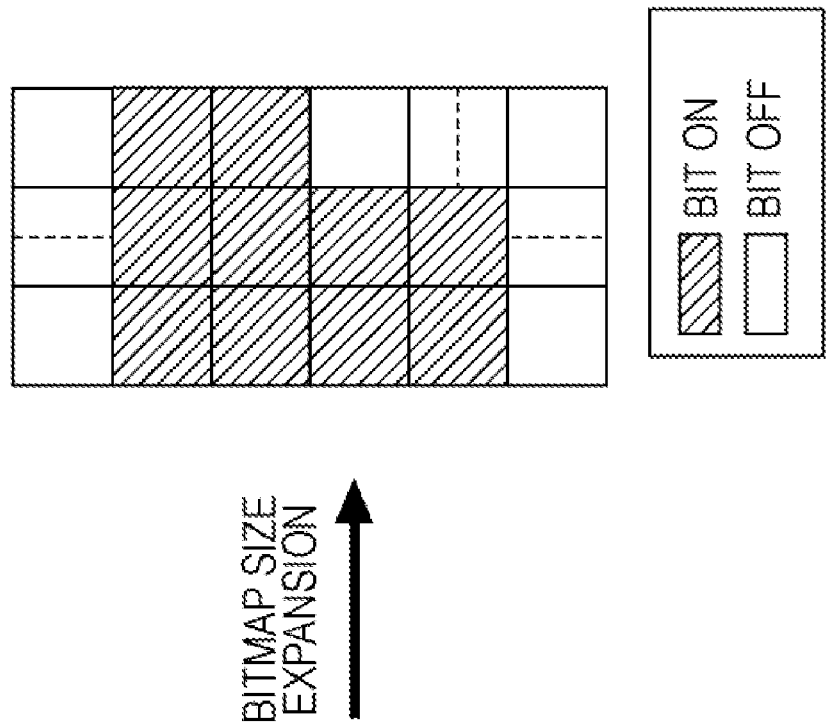
FIGS. 4A and 4B illustrate a bitmap expanded by a non-integer multiple times.

For simplicity of explanation, the bitmap size is an integer multiple of the pre-conversion bitmap in the above example. FIG. 4 illustrates a non-integer multiple conversion. In the case of the non-integer multiple conversion, a pre-conversion block and a post-conversion block are not in an integer multiple relationship but in a more complex relationship. More specifically, one index bit of the post-conversion bitmap (see FIG. 4B) corresponds to a plurality of index bits of the pre-conversion bitmap (see FIG. 4A). If a plurality of related pre-conversion bits is partially on, the expansion bitmap modifier 2 sets the post-conversion bitmap to on.

If the operation server 401 performs a write I/O operation and a copying operation, the state of the bitmap has changed. During the switching of the bitmap, both the write I/O operation and the copying operation are preferably suspended on the volume. The bitmap switching takes longer time with the bitmap size increasing. In order to perform the bitmap switching with the storage system continuously operating, the bitmap switching needs to be performed without suspending the write I/O operation and the copying operation.

A method of performing the bitmap switching with the storage device continuously operating is described with reference to FIGS. 5A-5D. The pre-conversion bitmap (see FIG. 5A) is converted to the post-conversion bitmap (see FIG. 5B) with a smaller block size than that prior to the conversion. In accordance with the first embodiment, a write I/O bitmap (see FIG. 5C) having the same size as that of the post-conversion is prepared the during the bitmap conversion. More specifically, the write bitmap generator 3 generates the write I/O bitmap having the same bitmap size and the same block size as the one produced by the expansion bitmap generator 1.

If data of the copy source is updated in response to the write I/O operation from the operation server 401, the write bitmap modifier 4 manages an updated area of the virtual volume by rewriting the index bit corresponding to the updated area from off to on a bit on the write I/O bitmap. After the bitmap conversion, the bitmap merging unit 5 then merges the bitmap modified by the expansion bitmap modifier 2 (post-conversion bitmap) and the bitmap modified by the write bitmap modifier 4 (see FIG. 5D).

Figure 6:
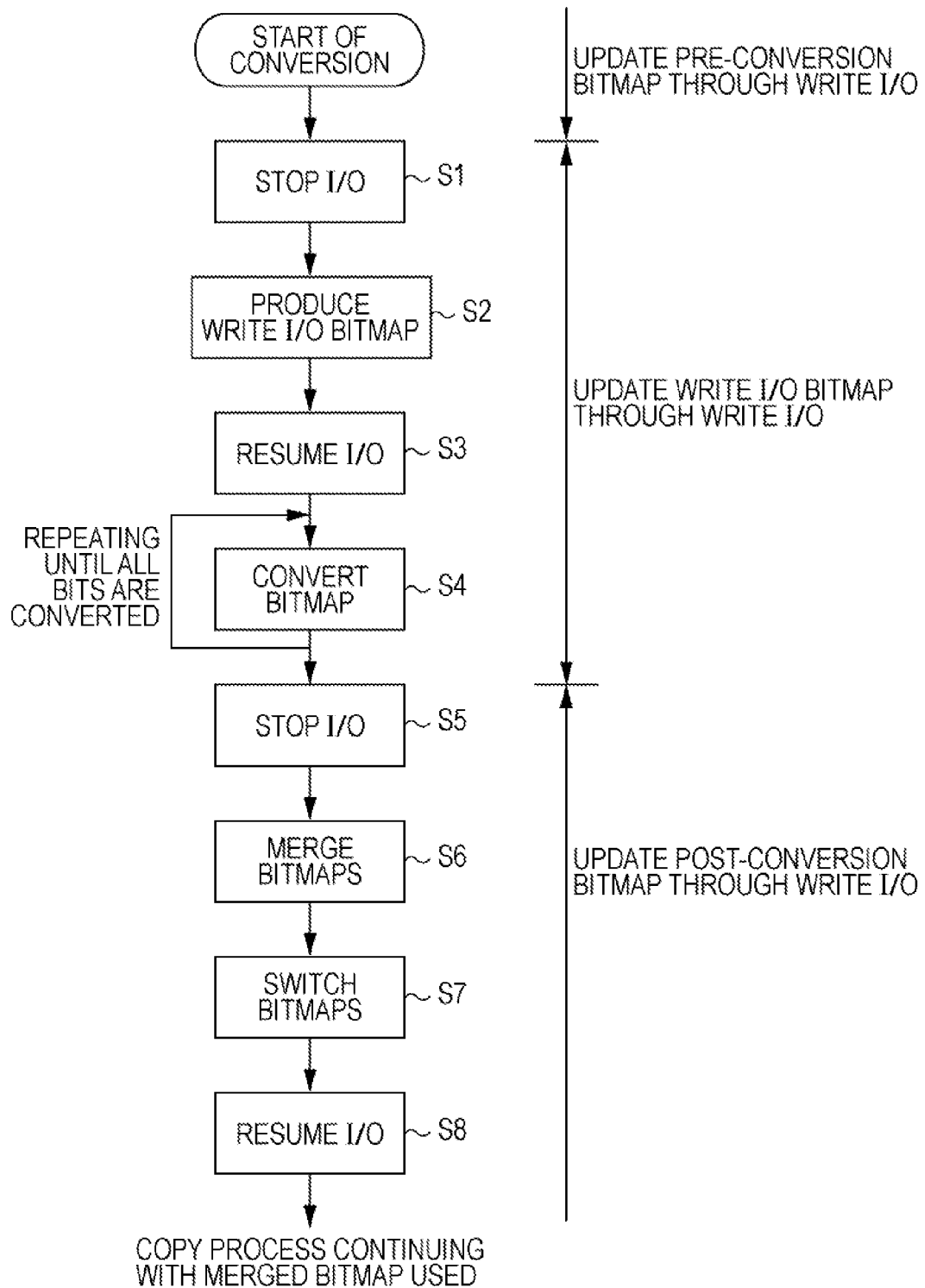
FIG. 6 is a flowchart illustrating an example of process of the virtual switch.

The above-described process is described below with reference to a flowchart illustrated in FIG. 6. A bitmap expansion process may be performed in the middle of the copying operation of data in a virtual volume to another virtual volume. The expansion bitmap generator 1 generates an expansion bitmap having a size larger than the current bitmap size (hereinafter, the current bitmap is referred to as a pre-conversion bitmap and the expansion bitmap is referred to a post-conversion bitmap).

The write bitmap generator 3 suspends the write I/O operation from the operation server 401 (S1), and generates the write I/O bitmap (S2). After generating the write I/O bitmap, the write bitmap generator 3 resumes the write I/O operation (S3). The expansion bitmap modifier 2 sets to off a bit corresponding to an index bit at off on the pre-conversion bitmap (S4). The expansion bitmap modifier 2 repeats step S4 until all the bits have been bit converted.

The write bitmap modifier 4 updates from off to on a bit on a write bitmap corresponding to a block updated at the generation of a write I/O operation.

When the bit modification operation of the expansion bitmap modifier 2 to the post-conversion bitmap is completed, the bitmap merging unit 5 temporarily suspends the write I/O operation and the copying operation from the operation server 401 (S5) so that the bitmap is not updated. The bitmap merging unit 5 merges the post-conversion bitmap and the write bitmap (S6). The bitmap switch 6 then deletes the pre-conversion bitmap, and sets the merged bitmap as management information of the copy operation for the virtual volume, thereby switching from the pre-conversion bitmap to the merged bitmap (S7). The bitmap switch 6 resumes the write I/O operation, which has been in a suspended state (S8).

The bitmap merged by the bitmap merging unit 5 serves as the management information for the copying operation so that the copying operation and the write I/O operation of the virtual volume are continuously performed.

In accordance with the embodiments, the size of the bitmap information can be changed with the I/O operation from the host and the copying operation kept operating.

FIGS. 7A-7C illustrate the data updating responsive to a write I/O instruction. The data updating is managed in accordance with the pre-conversion bitmap rather than preparing the write I/O bitmap. FIG. 7A illustrates the state of the pre-conversion bitmap. If the data updating responsive to the write I/O instruction is managed in accordance with the pre-conversion bitmap of FIG. 7A, the pre-conversion bitmap takes the state illustrated in FIG. 7B. If such a bitmap is directly converted, the state illustrated in FIG. 7C results. The comparison of the process results using the write I/O bitmap (see FIG. 5D) with the process results without using the write I/O bitmap (see FIG. 7C) illustrates that three blocks are needlessly copied with respect to the virtual volume.

Figure 8:
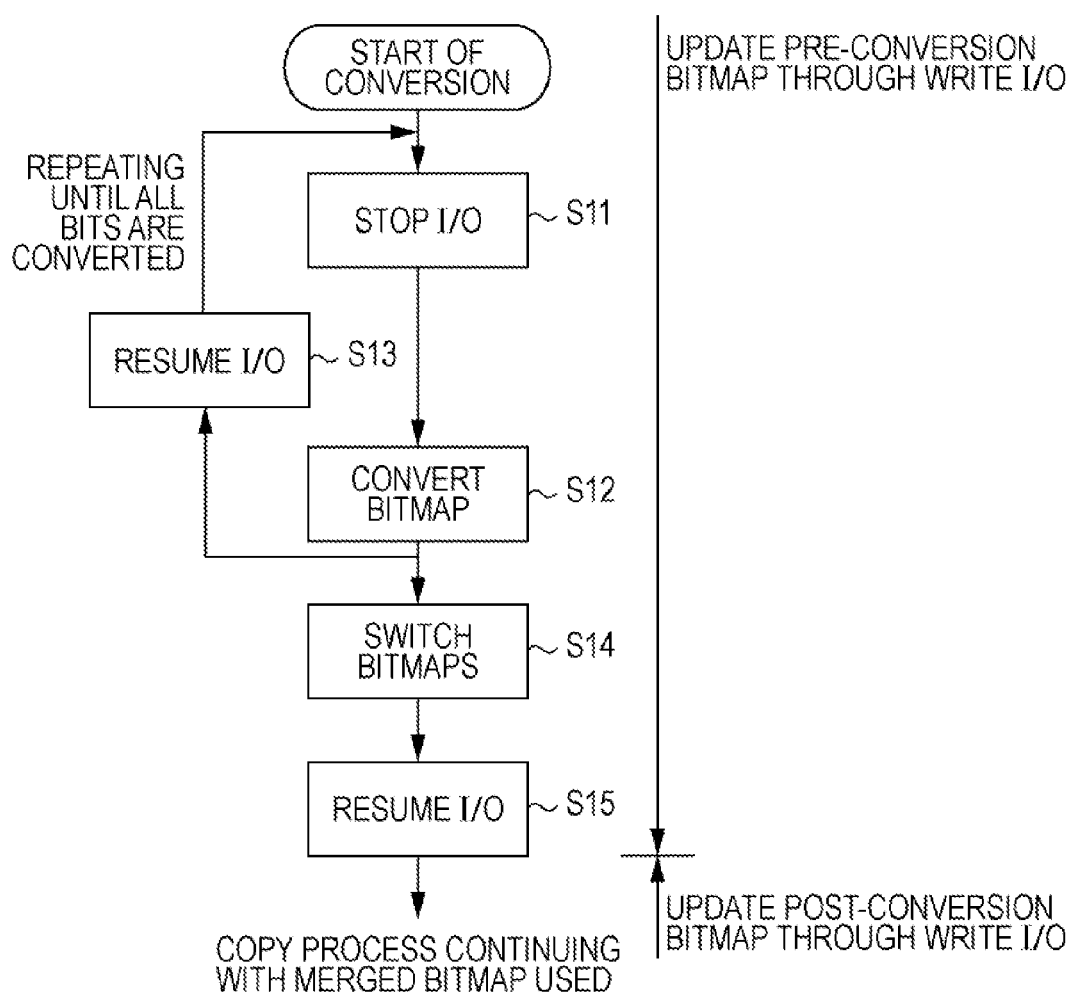
FIG. 8 is a flowchart illustrating an operation of the virtual switch with no write I/O bitmap prepared.

The process example with no write I/O bitmap prepared is described with reference to a flowchart illustrated in FIG. 8.

The copying operation of the virtual volume and the write I/O operation from the operation server 401 are suspended (S11), and the bitmap conversion operation is performed (S12). After the bitmap conversion process, the copying operation of the virtual volume and the write I/O operation from the operation server 401, once suspended, resume (S13). Process steps in S11-S13 are repeated until all the index bits are converted.

After all the index bits are converted, the bitmap is switched (S14). The copying operation of the virtual volume and the write I/O operation from the operation server 401 resume (S15). The copying operation of the virtual volume and the write I/O operation from the operation server 401 are continuously performed with the pre-conversion bitmap serving as the management information of the copying operation of the virtual volume.

Through steps S11-S14, the pre-conversion bitmap is updated in response to the write I/O instruction generated by the operation server 401, and in step S15 thereafter, the post-conversion bitmap is updated in response to the write I/O instruction generated by the operation server 401.

FIGS. 9A-9F illustrate the pre-conversion bitmap, the post-conversion bitmap, and the write I/O bitmap in comparison. With reference to FIGS. 9A-9F, a process of setting to off a bit of a copied block is described.

The copying operation in the middle of the bitmap conversion is performed on the pre-conversion bitmap on a per block basis. More specifically, the expansion bitmap modifier 2 sets to off a bit of a copied block on the pre-conversion bitmap (see FIGS. 9A and 9B). The expansion bitmap modifier 2 then sets to off a bit on the pre-conversion bitmap related to all the index bits set to off on the pre-conversion bitmap (see FIGS. 9C and 9D).

The write bitmap generator 3 does not set to off a bit contained in the copied pre-conversion block on the write I/O bitmap (see FIGS. 9E and 9F). This arrangement is intended to prevent the block from shifting to the copied state regardless of the necessity of copying if the write I/O operation is performed from the operation server 401 within a period from the copy completion to the setting of the bit to off.

Figure 10:
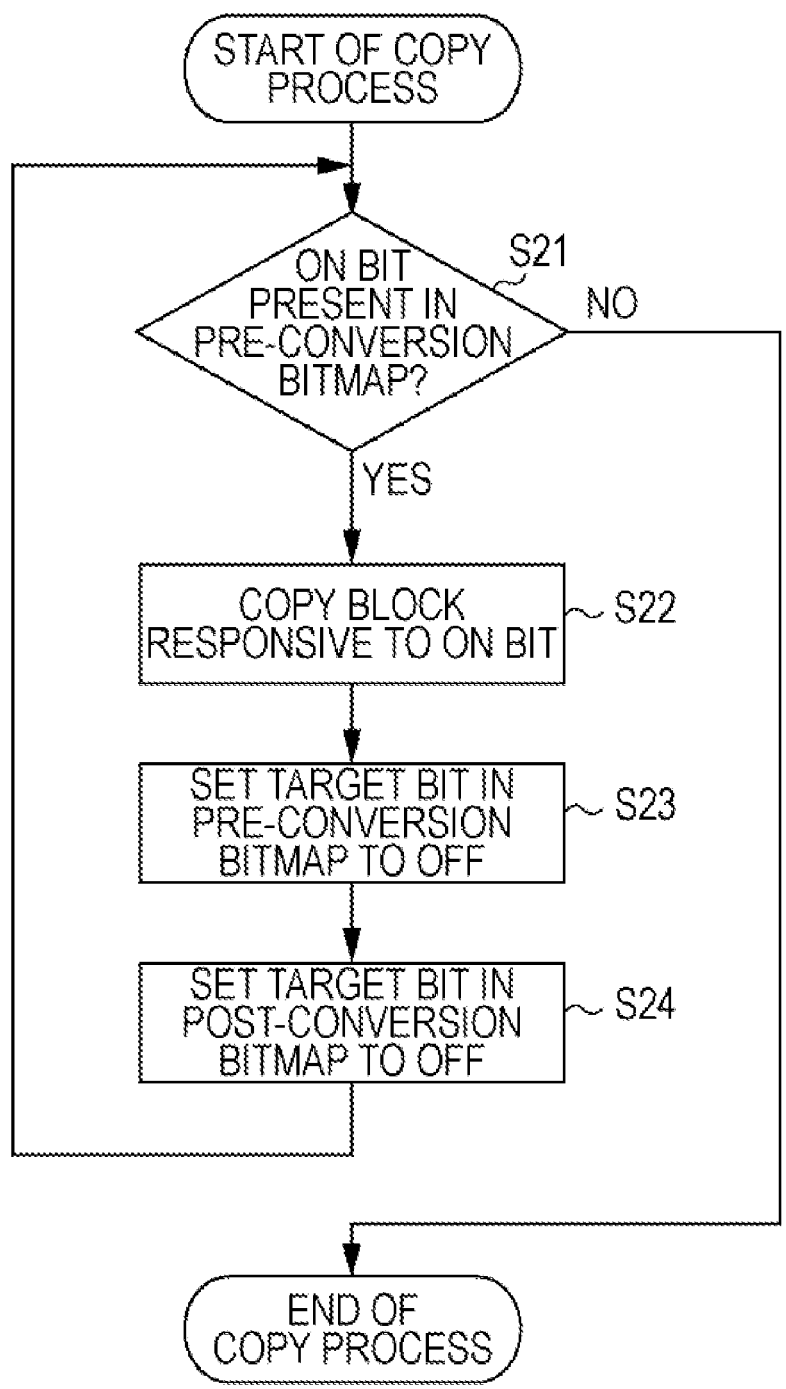
FIG. 10 is a flowchart illustrating an example of copying operation of the virtual volume.

The copying operation of the virtual volume is described below with reference to a flowchart of FIG. 10.

The expansion bitmap modifier 2 determines whether an on bit is present within the pre-conversion bitmap (S21). If it is determined that no on bit is present (No in step S21), the copying operation is terminated.

If it is determined that an on bit is present (Yes in step S21), a block of the virtual volume corresponding to the on bit is copied (S22). The expansion bitmap modifier 2 then sets to off the corresponding bit on the pre-conversion bitmap (S23), and sets to off the corresponding bit on the post-conversion bitmap.

In accordance with the first embodiment, a method of expanding the bitmap size (contracting the partition size) has been discussed. An area is ensured by contracting the bitmap size (expanding the partition size) if control data area is insufficient in the virtual switch 100. A second embodiment is related to a virtual switch 200 that contracts the bitmap. The second embodiment is described below.

Figure 11:
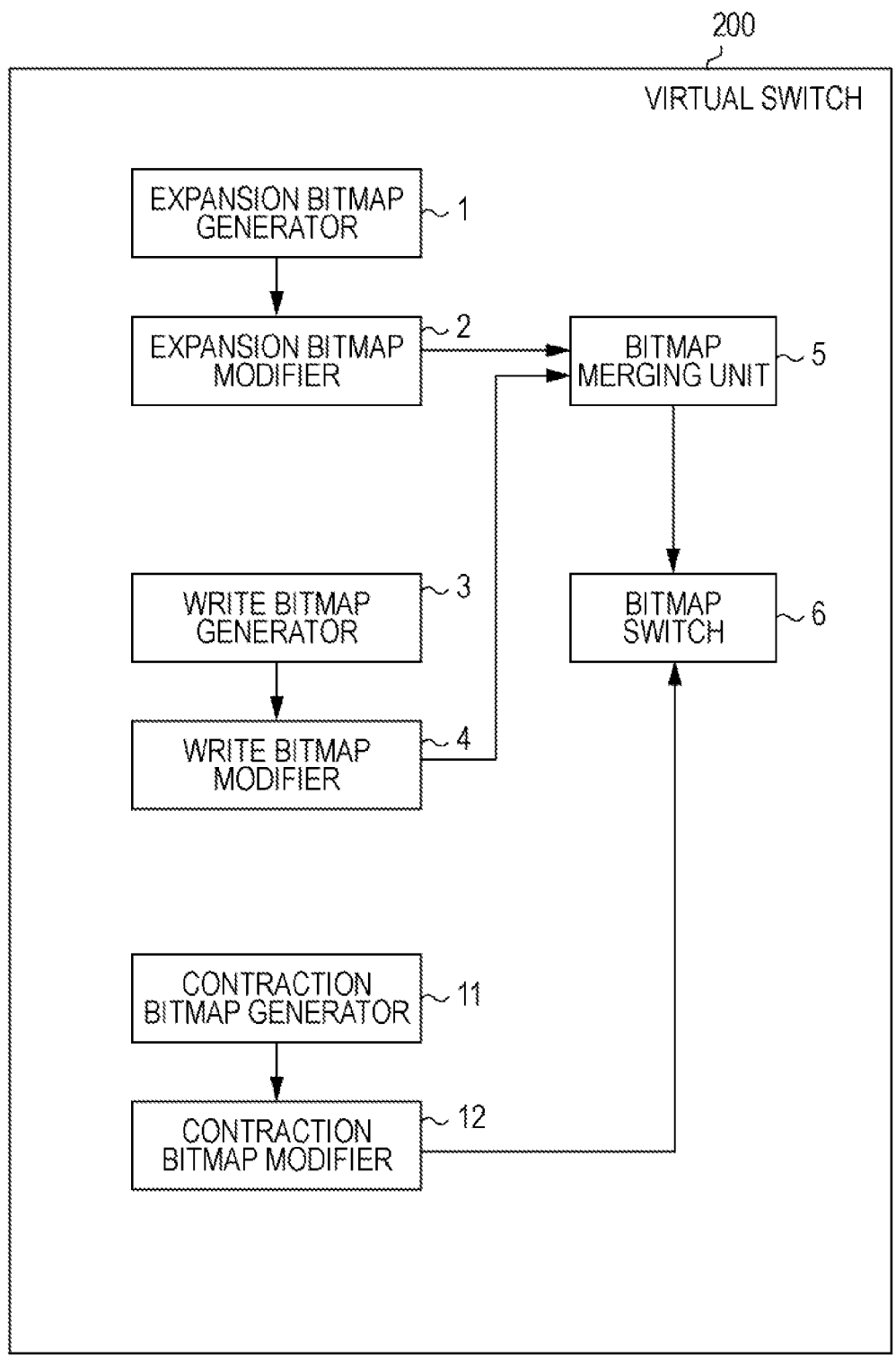
FIG. 11 is a functional block diagram illustrating a virtual switch.

FIG. 11 is a functional block diagram of the virtual switch 200 of the second embodiment. The virtual switch 200 further includes a contraction bitmap generator 11 and a contraction bitmap modifier 12 in addition to the elements in the virtual switch 100 of the first embodiment.

The contraction bitmap generator 11 generates a bitmap that maps each region having a partition size larger than the current partition size to an index bit (third bitmap).

The contraction bitmap modifier 12 modifies on the third bitmap an index bit corresponding to a copied region within the virtual volume. If a write request from the operation server 401 has occurred to the virtual volume in the middle of the copying operation of the virtual volume, the contraction bitmap modifier 12 further modifies on the bitmap having the current partition size an index bit corresponding to a region within the virtual volume to which the write request has occurred.

Each functional block having the same reference numeral is identical to the counterpart in the first embodiment, and the discussion thereof is omitted here. The hardware structure of the virtual volume 200 is also identical to the hardware structure of the virtual switch 100 of the first embodiment, and the discussion thereof is omitted here.

The contraction of the bitmap size is described with reference to FIGS. 12A and 12B. In the following case, a 4 MB bitmap managing a 64 MB volume is converted to a 2 MB bitmap managing the 64 MB volume.

The contraction bitmap generator 11 generates a bitmap having a block size of 2 MB (see FIG. 12B) from a current bitmap having a block size of 1 MB (see FIG. 12A). Since the overall virtual volume size is 64 MB, the generated bitmap has a size of 2 bytes contracted from a size of 4 bytes. If the bitmap size is halved, the number of blocks manageable is also halved. The block size is inverse proportionally increased, namely, doubled.

Two index bits on the pre-conversion bitmap correspond to one index bit on the post-conversion bitmap. The contraction bitmap modifier 12 sets, to on, all index bits related to an on bit on the pre-conversion bitmap.

Figure 13B:
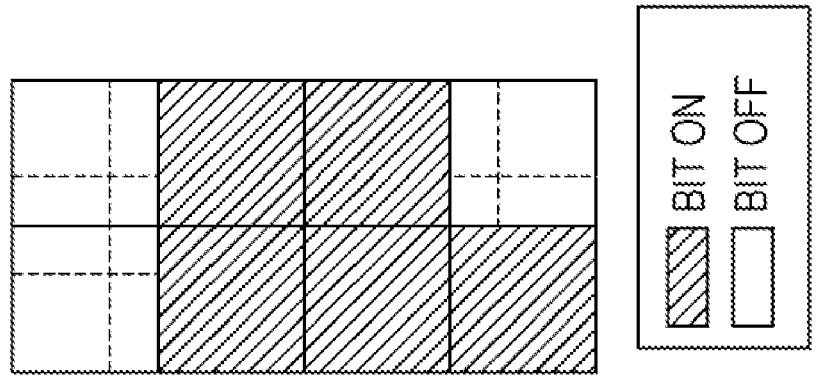
FIGS. 13A and 13B illustrate a bitmap contracted by a non-integer fraction.
Figure 13A:
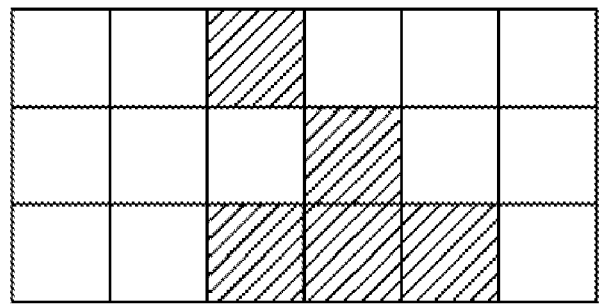

In the above discussion, the bitmap size prior to the conversion is an integer multiple of the bitmap subsequent to the conversion for simplicity of explanation. In the non-integer case, one index bit on the pre-conversion bitmap (see FIG. 13A) is related to a plurality index bits on the post-conversion bitmap (see FIG. 13B). In such a case, if a plurality of index bits are partially on prior to the conversion, the related bits on the post-conversion bitmap are set to be on.

Figure 14:
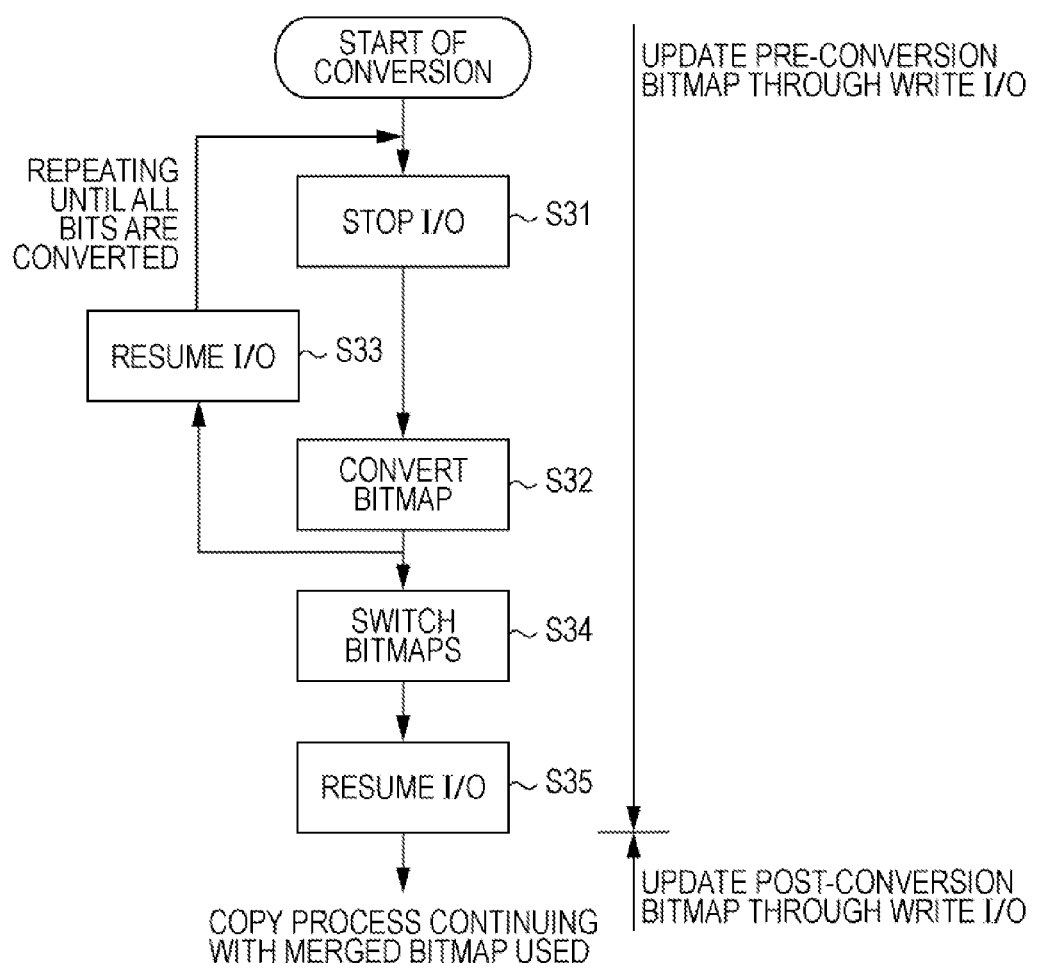
FIG. 14 is a flowchart illustrating a process of the virtual switch.

FIG. 14 is a flowchart illustrating a bitmap contraction operation that is performed in the middle of the copying operation of the virtual volume. In the bitmap contraction, the pre-conversion bitmap permits finer data management, and the write I/O bitmap is not generated in the bitmap contraction operation.

The bitmap contraction operation is thus performed in the middle of the copying operation of the virtual volume. The contraction bitmap generator 11 generates a contraction bitmap having a size smaller than the current bitmap size (hereinafter, the current bitmap is referred to as a pre-conversion bitmap, and a contraction bitmap is referred to as a post-conversion bitmap).

The contraction bitmap modifier 12 suspends a write I/O operation from the operation server 401 and a copying operation of the virtual volume (S31). The contraction bitmap modifier 12 then sets to on a bit on the post-conversion bitmap corresponding to an index bit on in the pre-conversion bitmap (S32). Subsequent to S32, the contraction bitmap modifier 12 resumes the write I/O operation from the operation server 401 and the copying operation of the virtual volume (S33). The contraction bitmap modifier 12 then repeats S31-S33 until all the index bits are converted.

Subsequent to the bitmap contraction operation, the bitmap switch 6 performs bitmap switching (S34). The bitmap switch 6 then temporarily suspends the write I/O operation and the copying operation to delete the pre-conversion bitmap. The write I/O operation from the operation server 401 and the copying operation of the virtual volume then resume (S35).

The write I/O operation and the copying operation are then performed after the bitmap switching.

If a write I/O instruction to the virtual volume is received in the middle of the bitmap switching, the contraction bitmap modifier 12 sets to on a bit of a block of a region of the pre-conversion bitmap having undergone writing. The coping operation in the middle of the bitmap switching is performed on a per block basis of the pre-conversion bitmap.

The virtual volume of the second embodiment with at least one magnetic disk device connected thereto may be provided as a storage system.

The finer the block size managed by bitmap, the less likely a needless copying operation responsive to an on bit caused by the write I/O operation occurs. However, the finer the block size, the larger the bitmap size. The block size is thus preferably determined taking into consideration the trend of I/O operations from the operation server.

In accordance with a third embodiment, the bitmap size conversion discussed with reference to the first and second embodiments is automatically performed by analyzing the I/O trend from the operation server.

Figure 15:
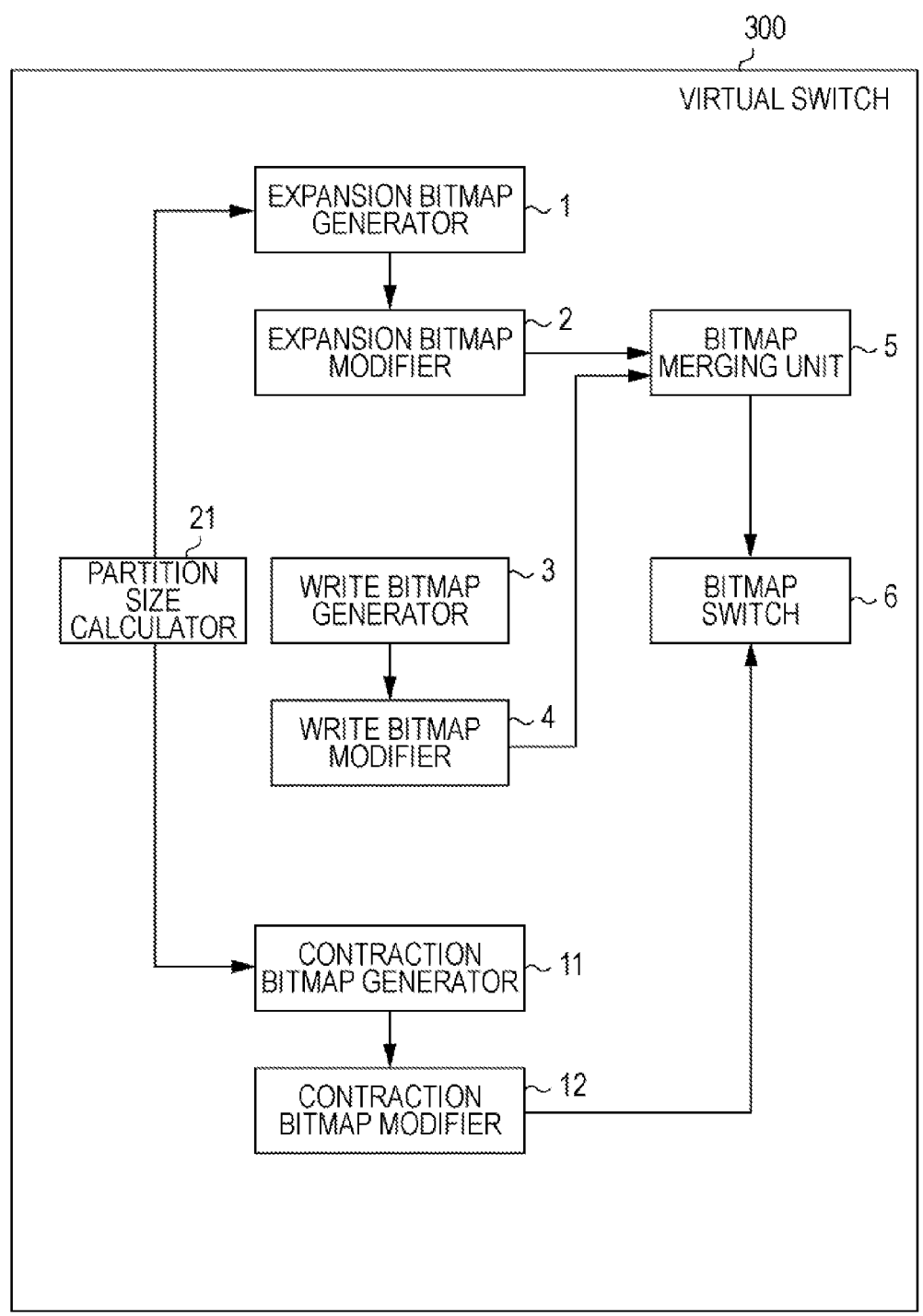
FIG. 15 is a functional block diagram of a virtual switch.
Figure 18:
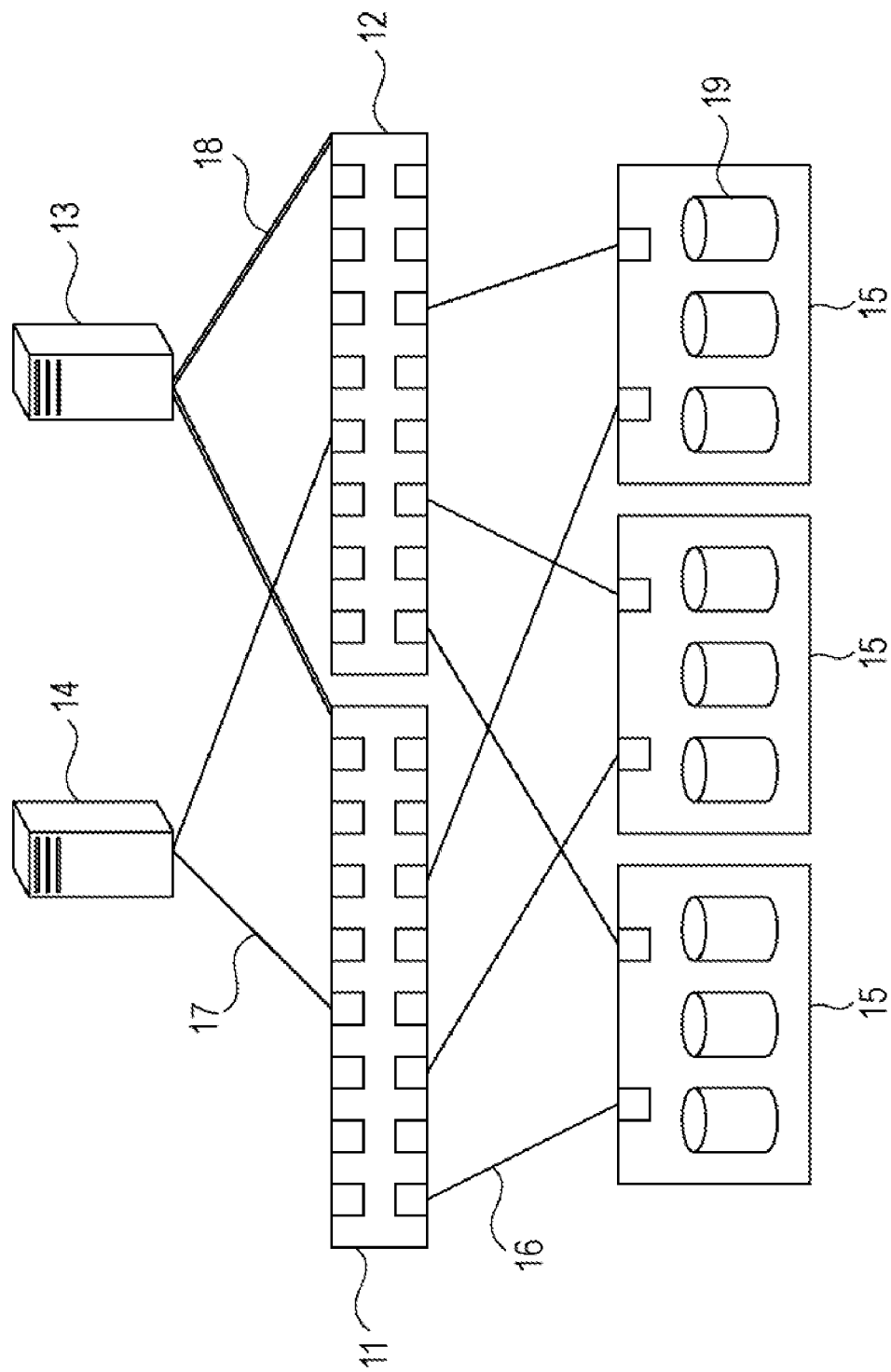
FIG. 18 illustrates a structure of a storage system.

FIG. 15 is a functional block diagram of a virtual switch 300 of the third embodiment. The virtual switch 300 further includes a partition size calculator 21 in addition to the elements of the virtual volume 200 of the second embodiment.

The partition size calculator 21 stores statistic information of the size of data written onto the virtual volume by the operation server 401, and then calculates the partition size of the virtual volume based on the statistic information. One of the expansion bitmap generator 1 and the contraction bitmap generator 11 generates the bitmap in which the region having the calculated partition size is mapped to each bit. The bitmap switching is then performed as previously discussed with reference to the first and second embodiments.

The functional elements designated with the same reference numeral in the third embodiment are identical to those in the first and second embodiments, and the discussion thereof is omitted here. The hardware structure of the virtual switch 300 is also identical to the hardware structure of the virtual switch 100 of the first embodiment, and the discussion thereof is also omitted here.

The process of the partition size calculator 21 is described below. The statistic of the I/Os from the operation server 401 is managed on a per virtual volume basis. Upon receiving a write I/O instruction to the virtual volume, the partition size calculator 21 stores a size to be written onto that virtual volume as the statistic information.

FIG. 16 illustrates the statistic information stored by the partition size calculator 21. Referring to FIG. 16, the partition size calculator 21 stores virtual volume numbers respectively identifying virtual volumes, sequential numbers (access sizes 1, ..., N) assigned to accesses to the virtual volume of volume number, and data sizes of the data accessed ($x_1, x_2, ..., x_n$, in FIG. 16). The number assigned to the access size may also be used as the number of accesses to the virtual volume.

The partition size calculator 21 analyzes the I/O trend in accordance with equations in FIGS. 17A and 17B.

If data accumulated by a pre-defined number of times (N times) is stored, the partition size calculator 21 calculates the mean value $\mu$ of access sizes (see FIG. 17A), and the standard deviation $\delta$ (see FIG. 17B). The larger the standard deviation, the more the data is varied. If $\delta$ is less than R % of $\mu$ (R is a pre-defined value), the write I/O operation tends to be performed at a value close to a constant size $\mu$. The expansion bitmap generator 1 or the contraction bitmap generator 11 performs the bitmap expansion operation (see the first embodiment) or the bitmap contraction operation (see the second embodiment), respectively.

If the partition size calculator 21 calculates a partition size smaller than the current partition size, the expansion bitmap generator 1 generates a bitmap of the partition size calculated by the partition size calculator 21. If the partition size calculator 21 calculates a partition size larger than the current partition size, the contraction bitmap generator 11 generates a bitmap of the partition size calculated by the partition size calculator 21.

If N is small, the bitmap size conversion frequently occurs, and the overhead involved in the bit size conversion becomes problematic. Conversely, if N is too large, the automatic conversion of the bitmap size does not occur at all. Similarly, if R is large, the automatic conversion of the bitmap size frequently occurs regardless of variations in accessing. If R is small, accessing is determined to be dispersed, and the automatic conversion of the bitmap size does not occur at all. The partition size calculator 21 thus receives the setting of N and R from a management interface of the virtual switch so that N and R are modified to optimum values in view of operational status.

The virtual switch 300 of the third embodiment with at least one magnetic disk device connected thereto may be provided as a storage system.

The bitmap size is dynamically modified in accordance with the first through third embodiments. The following advantages are thus provided with the server continuously operating.

In accordance with the embodiments, the block size is appropriately adjusted to meet operational status. The copying operation is efficiently performed. In accordance with the embodiments, contention with the copying operation is reduced, leading to performance improvement of the write I/O.

In accordance with the embodiments, the expansion of the bitmap size allows an unused control data area within the virtual switch to be efficiently used. In accordance with the embodiments, the contraction of the bitmap size assures an area for data when the control data area is insufficient in the virtual switch.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage switch for controlling reading and writing of data from and into a storage area, the storage switch comprising:
    a first bitmap generator for generating a first bitmap including a plurality of index bits which render the storage area to be partitioned into a plurality of regions each having a predetermined partition size and being associated with each of the index bits of the first bitmap;
    a controller for controlling copying of data in a part of the regions to another part of the regions;
    a first modifier for modifying at least one of the index bits associated with at least one of the regions having undergone a copying;
    a second bitmap generator for generating a second bitmap including a plurality of index bits which render the storage area to be partitioned into a plurality of sub-regions each having a partition size smaller than the predetermined partition size and being associated with each of the index bits of the second bitmap, the controller controlling writing of data into at least one of the sub-regions addressed by a write request from the exterior;
    a second modifier for modifying at least one of the index bits corresponding to the at least one sub-regions addressed by the write request from the exterior; and
    a merging controller for controlling to generate a third bitmap including a plurality of index bits which render the storage area to be partitioned into a plurality of sub-regions each having the same size as the partition size, the merging controller, when the writing of data is performed during the copying of data, modifying a part of the index bits in the third bitmap corresponding to a part of the index bits of the first bitmap modified by the first modifier on account of the copying of data performed before the writing of data, and merging the second bitmap modified by the second modifier and the third bitmap modified by the merging controller;
the controller resuming copying of data of any sub-regions on the basis of the merged bitmap.

2. The storage switch according to claim 1, further comprising:
a bitmap switching controller for switching from the bitmap having a predetermined partition size to the merged bitmap provided by the merging controller.

3. The storage switch according to claim 1, further comprising:
a forth bitmap generator for generating a forth bitmap including a plurality of index bits which render the storage area to be partitioned into a plurality of regions each having a partition size larger than a predetermined partition size; and
a third modifier modifying at least one of the index bits associated with at least one of the regions having undergone a copying, and modifying, when the writing of data is performed during the copying of data, at least one of the index bits corresponding to the at least one sub-regions addressed by the write request.

4. The storage switch according to claim 3, further comprising:
a partition size calculator for storing statistic information of a data size of data to be written onto the storage area and calculating a size according to which the storage area is to be virtually partitioned on the basis of the statistic information;
wherein the first bitmap generator generates the first bitmap with the region of the partition size calculated by the partition size calculator mapped to an index bit if the partition size calculated by the partition size calculator is smaller than the predetermined partition size; and
wherein the forth bitmap generator generates the forth bitmap with the region of the partition size calculated by the partition size calculator mapped to an index bit if the partition size calculated by the partition size calculator is larger than the predetermined partition size.

5. A storage system for copying data in accordance with a bitmap, the storage system comprising:
a storage device for storing data;
a first bitmap generator for generating a first bitmap including a plurality of index bits which render the storage area to be partitioned into a plurality of regions each having a predetermined partition size and being associated with each of the index bits of the first bitmap;
a controller for controlling copying of data in a part of the regions to another part of the regions;
a first modifier for modifying at least one of the index bits associated with at least one of the regions having undergone a copying;
a second bitmap generator for generating a second bitmap including a plurality of index bits which render the storage area to be partitioned into a plurality of sub-regions each having a partition size smaller than the predetermined partition size and being associated with each of the index bits of the second bitmap, the controller controlling writing of data into at least one of the sub-regions addressed by a write request from the exterior;
a second modifier for modifying at least one of the index bits corresponding to the at least one sub-regions addressed by the write request from the exterior; and
a merging controller for controlling to generate a third bitmap including a plurality of index bits which render the storage area to be partitioned into a plurality of sub-regions each having the same size as the partition size, the merging controller, when the writing of data is performed during the copying of data, modifying a part of the index bits in the third bitmap corresponding to a part of the index bits of the first bitmap modified by the first modifier on account of the copying of data performed before the writing of data, and merging the second bitmap modified by the second modifier and the third bitmap modified by the merging controller;
the controller resuming copying of data of any sub-regions on the basis of the merged bitmap.

6. The storage system according to claim 5, further comprising:
a bitmap switching controller for switching from the bitmap having a predetermined partition size to the merged bitmap provided by the merging controller.

7. The storage system according to claim 5, further comprising:
a forth bitmap generator for generating a forth bitmap including a plurality of index bits which render the storage area to be partitioned into a plurality of regions each having a partition size larger than a predetermined partition size; and
a third modifier modifying at least one of the index bits associated with at least one of the regions having undergone a copying, and modifying, when the writing of data is performed during the copying of data, at least one of the index bits corresponding to the at least one sub-regions addressed by the write request.

8. The storage system according to claim 7, further comprising:
a partition size calculator for storing statistic information of a data size of data to be written onto the storage area and calculating a size according to which the storage area is to be virtually partitioned on the basis of the statistic information;
wherein the first bitmap generator generates the first bitmap with the region of the partition size calculated by the partition size calculator mapped to an index bit if the partition size calculated by the partition size calculator is smaller than the predetermined partition size; and
wherein the forth bitmap generator generates the forth bitmap with the region of the partition size calculated by the partition size calculator mapped to an index bit if the partition size calculated by the partition size calculator is larger than the predetermined partition size.

9. A data copying method of copying data in accordance with a bitmap, comprising:
generating a first bitmap including a plurality of index bits which render the storage area to be partitioned into a plurality of regions each having a predetermined partition size and being associated with each of the index bits of the first bitmap;
controlling copying of data in a part of the regions to another part of the regions;
modifying, regarding to the first bitmap, at least one of the index bits associated with at least one of the regions having undergone a copying;
generating a second bitmap including a plurality of index bits which render the storage area to be partitioned into a plurality of sub-regions each having a partition size smaller than the predetermined partition size and being associated with each of the index bits of the second bitmap;
controlling writing of data into at least one of the sub-regions addressed by a write request from the exterior;

modifying, regarding to the second bitmap, at least one of the index bits corresponding to the at least one sub-regions addressed by the write request from the exterior;

controlling to generate a third bitmap including a plurality of index bits which render the storage area to be partitioned into a plurality of sub-regions each having the same size as the partition size;

when the writing of data is performed during the copying of data, modifying a part of the index bits in the third bitmap corresponding to a part of the index bits of the modified first bitmap on account of the copying of data performed before the writing of data;

merging the modified second bitmap and the modified third bitmap; and resuming copying of data of any sub-regions on the basis of the merged bitmap.

10. The data copying method according to claim 9, further comprising:

switching from the bitmap having a predetermined partition size to the merged bitmap.

11. The data copying method according to claim 9, further comprising:

generating a forth bitmap including a plurality of index bits which render the storage area to be partitioned into a plurality of regions each having a partition size larger than a predetermined partition size; and modifying at least one of the index bits associated with at least one of the regions having undergone a copying, and modifying, when the writing of data is performed during the copying of data, at least one of the index bits corresponding to the at least one sub-regions addressed by the write request.

12. The data copying method according to claim 11, further comprising:

storing statistic information of a data size of data to be written onto the storage area and calculating a size according to which the storage area is to be virtually partitioned on the basis of the statistic information;

generating the first bitmap with the region of the partition size calculated in the partition size calculation mapped to an index bit if the partition size calculated in the partition size calculation is smaller than the predetermined partition size; and generating the forth bitmap with the region of the partition size calculated in the partition size calculation mapped to an index bit if the partition size calculated in the partition size calculation is larger than the predetermined partition size.

* * * * *